Dec. 11, 1934.  F. M. PISCULLI  1,984,081
SPOON
Filed March 30, 1934
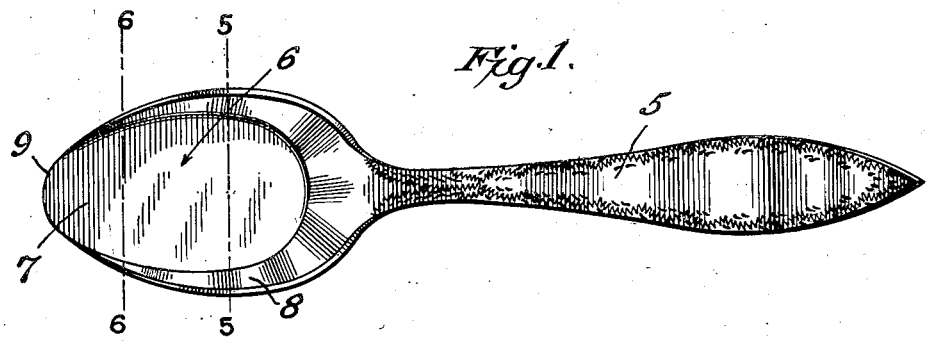
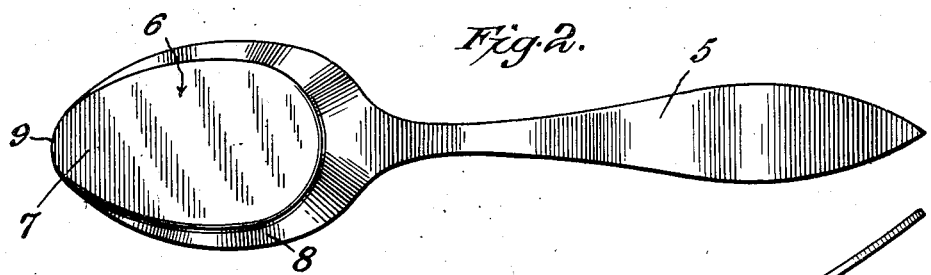
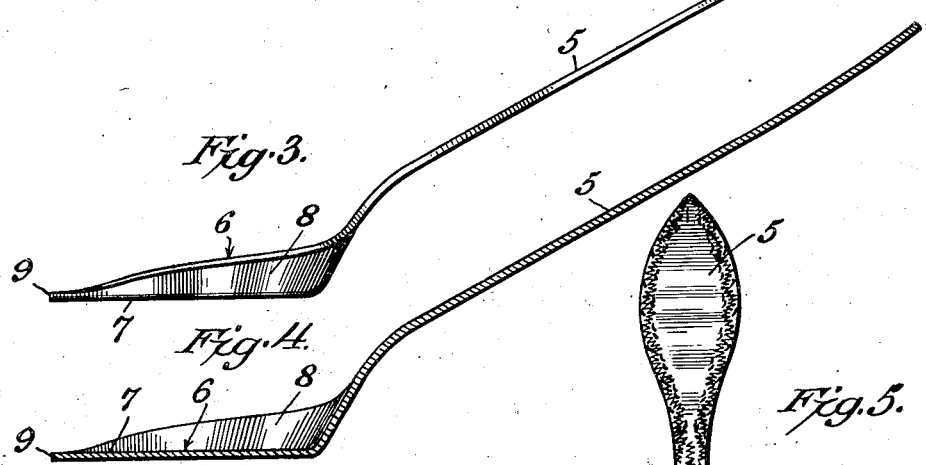
Inventor
Ferdinand M. Pisculli,
By Henry T. Right
Attorney Patented Dec. 11, 1934

1,984,081

UNITED STATES PATENT OFFICE 1,984,081

SPOON

Ferdinand M. Pisculli, Yonkers, N. Y.

Application March 30, 1934, Serial No. 718,265

2 Claims. (Cl. 30—22)

The present invention relates to spoons and more particularly to a spoon designed for eating ice cream and similar food products.

One of the important objects of the invention is to provide a novel blade or scoop for a spoon from which the discharge of the contents into the mouth is facilitated and in which the use of the upper lip to drag the contents from the spoon is dispensed with.

In the eating of certain foods, particularly ice cream and analogous products, it has been found through actual tests that the taste of the food is improved when it is deposited into the mouth beyond the lips and accordingly the present invention has been designed to accomplish this purpose.

A spoon of this character is also more desirable by women because there is little need for using the upper lip to drag the contents from the spoon and accordingly the coating of lip stick usually applied to women's lips will not affect the taste of the food, nor will it become necessary for a woman to reapply the lip stick after eating.

A further object is to provide a spoon which is more suitable for use in feeding infants and small children.

Other objects and advantages reside in the special construction of the spoon as more fully hereinafter described and claimed, reference being had to the accompanying drawing forming part hereof, wherein like numerals refer to like parts throughout, and in which Figure 1 is a top plan view;

Figure 2 is a bottom plan view;

Figure 3 is a side elevational view;

Figure 4 is a longitudinal sectional view;

Figure 5 is a transverse sectional view of the spoon looking toward the handle and taken on a line 5—5 of Figure 1;

Figure 6 is a similar view looking toward the front of the spoon and taken on a line 6—6 of Figure 1.

Referring now to the drawing in detail, the numeral 5 designates the handle of the spoon, which is of conventional construction, and to which is attached the blade or scoop 6, the latter constituting the subject matter of the present invention.

This blade is formed with a flattened bottom portion 7, preferably of an oval or egg shaped formation, the rear and side edges of which incline upwardly and outwardly to form a guard, indicated generally at 8, to retain the food on the blade. The handle merges with the rear upturned edge as will be clearly apparent from an inspection of the drawing.

The height of this upturned edge is greater at the rear of the blade and gradually decreases in height toward the front until it terminates short of the front edge 9 of the bottom portion. Thus the extreme front edge and a small portion of the side edges of the bottom are unobstructed in order that the contents of the spoon may easily be discharged therefrom. The rear-most portion of the upturned edge inclines slightly toward the front for a distance approximately midway of the blade and then has its inclination increased more sharply as shown in Figures 3 and 4.

It will also be observed from a comparison of the transverse sectional views illustrated by Figures 5 and 6 that as the upturned edges decrease in height toward the front of the blade they also increase in inclination from the vertical and become more flattened as they merge with the flat bottom portion. Accordingly, the higher upturned edge at the rear adequately prevents discharge of the contents over the rear end of the spoon and the gradually decreased inclination toward the front facilitates the removal of the contents at the forward end with little or no aid from the upper lip of the user, when the front end of the spoon is tilted downwardly in the customary manner.

It will thus be seen that the upper lip plays no important part in the eating operation and allows the contents of the spoon to be deposited well toward the back of the mouth. Since the lips do not come into contact with the food, the taste of the food is not affected thereby.

Having thus described my invention, what I claim is:

1. A spoon comprising a handle, and a blade carried thereby and including a flat bottom portion having upwardly and outwardly inclined side and rear edges, said side edges decreasing in height toward the front of the blade and decreasing in their inclination from the plane of the flat bottom portion.

2. A spoon comprising a handle, and a blade carried thereby and including a flat bottom portion having upwardly and outwardly inclined side and rear edges, said side edges decreasing in height toward the front of the blade and decreasing in their inclination from the plane of the flat bottom portion and merging with the bottom short of the front edge of the latter whereby said front edge and a portion of each side edge of the bottom remains unobstructed.

FERDINAND M. PISCULLI.